US009438498B2

(12) United States Patent
Yoshikawa et al.

(10) Patent No.: US 9,438,498 B2
(45) Date of Patent: Sep. 6, 2016

(54) RESOURCE OPTIMIZATION METHOD, IP NETWORK SYSTEM AND RESOURCE OPTIMIZATION PROGRAM

(75) Inventors: Naoya Yoshikawa, Tokyo (JP); Tomohito Iguchi, Tokyo (JP); Ryosuke Ohara, Tokyo (JP)

(73) Assignee: NEC Corporation, Tokyo (JP)

( * ) Notice: Subject to any disclaimer, the term of this patent is extended or adjusted under 35 U.S.C. 154(b) by 64 days.

(21) Appl. No.: 14/343,025

(22) PCT Filed: Jun. 22, 2012

(86) PCT No.: PCT/JP2012/004052
§ 371 (c)(1),
(2), (4) Date: Mar. 5, 2014

(87) PCT Pub. No.: WO2013/038585
PCT Pub. Date: Mar. 21, 2013

(65) Prior Publication Data
US 2014/0201364 A1 Jul. 17, 2014

(30) Foreign Application Priority Data

Sep. 14, 2011 (JP) .................................. 2011-200433

(51) Int. Cl.
*H04L 12/26* (2006.01)
*G06F 9/48* (2006.01)
(Continued)

(52) U.S. Cl.
CPC ......... *H04L 43/0888* (2013.01); *G06F 9/4856* (2013.01); *H04L 65/105* (2013.01); *H04L 65/1006* (2013.01); *H04L 65/80* (2013.01); *H04L 67/148* (2013.01); *H04M 7/006* (2013.01)

(58) Field of Classification Search
CPC ............... H04L 65/105; H04L 67/148; H04L 43/0888; H04L 65/80; H04L 65/1006; G06F 9/4856; H04M 7/006
See application file for complete search history.

(56) References Cited

U.S. PATENT DOCUMENTS 8,224,957 B2 * 7/2012 Hansson ............... G06F 9/5077
709/224
8,311,032 B2 * 11/2012 Smith ................. H04L 43/0852
370/351

(Continued)

FOREIGN PATENT DOCUMENTS

JP 2003-037553 A 2/2003
JP 2005-318411 A 11/2005

(Continued)

OTHER PUBLICATIONS

International Search Report corresponding to PCT/JP2012/004052 dated Aug. 14, 2012; 2 pages.

(Continued)

*Primary Examiner* — Joe Chacko
(74) *Attorney, Agent, or Firm* — Wilmer Cutler Pickering Hale and Dorr LLP

(57) ABSTRACT

There is provided a resource optimization method enabling a stable live migration. An amount of generated traffic that is anticipated to be generated is estimated based on the number of subscribers to be processed by a SIP server on a virtual machine (step S1). Since it is not necessary to perform a live migration of the virtual machine when the estimated amount of generated traffic is less than or equal to an optimum value predetermined as throughput of physical hardware on which the virtual machine operates ("Yes" in step S2), monitoring of the number of number of subscribers is continued by returning to step S1. Meanwhile, when the estimated amount of generated traffic exceeds the optimum value ("No" in step S2), an optimum physical hardware which has a margin for processing the amount of generated traffic is selected, and the virtual machine live-migrates to the selected physical hardware (step S3).

7 Claims, 2 Drawing Sheets

(51) Int. Cl.
  *H04L 29/06* (2006.01)
  *H04L 29/08* (2006.01)
  *H04M 7/00* (2006.01)

(56) References Cited

U.S. PATENT DOCUMENTS

2009/0106409 A1   4/2009   Murata
2009/0228589 A1*  9/2009   Korupolu ............ H04L 67/1097
                                                    709/226

FOREIGN PATENT DOCUMENTS

| JP | 2006-268684 A | 10/2006 |
| JP | 2009-0116852  | 5/2009  |
| JP | 2009-199122   | 9/2009  |
| JP | 2010-033292   | 2/2010  |
| JP | 2010-086145   | 4/2010  |
| JP | 2010-224756 A | 10/2010 |
| JP | 2011-013822   | 1/2011  |
| JP | 2011-090537   | 5/2011  |

OTHER PUBLICATIONS

Japanese Office Action issued by the Japanese Patent Office for Patent Application No. 2013-533462 dated May 26, 2015 (8 pages).
Asma, B. L. et al., "State of the Art and Research Challenges of new services architecture technologies: Virtualization, SOA and Cloud Computing," International Journal of Grid and Distributed Computing, vol. 3, No. 4, pp. 69-88 (Dec. 2010).
Extended European Search Report issued by the European Patent Office for Application No. 12831601.5 dated Apr. 2, 2015 (8 pages).
Japanese Office Action issued by the Japanese Patent Office for Patent Application No. 2010-533462 dated May 26, 2015 (8 pages).
Japanese Decision to Grant a Patent corresponding to Japanese Patent Application No. 2013-533462, dated Dec. 22, 2015, 5 pages.

* cited by examiner

RESOURCE OPTIMIZATION METHOD, IP NETWORK SYSTEM AND RESOURCE OPTIMIZATION PROGRAM

CROSS-REFERENCE TO RELATED APPLICATIONS

This application is a national stage application of International Application No.PCT/JP2012/004052 entitled "RESOURCE OPTIMIZATION METHOD, IP NETWORKSYSTEM AND RESOURCE OPTIMIZATION PROGRAM ," filed on Jun. 22, 2012, which claims the benefit of the priority of Japanese Patent Application No. 2011-200433, filed Sep. 14, 2011, the disclosures of each of which are hereby incorporated by reference in their entirety.

TECHNICAL FIELD

The present invention relates to a resource optimization method, an IP (Internet Protocol) network system and a resource optimization program.

BACKGROUND ART

Conventionally, in a case of optimizing resources of a virtual machine, only the current state of resources is used as disclosed in PTL 1: Japanese Unexamined Patent Application Publication No. 2011-90537, "PROGRAM, APPARATUS AND METHOD FOR CONTROLLING VIRTUAL MACHINE MOVEMENT", and there is merely provided a function of optimizing the resources of the virtual machine when the resources become very scarce. Such a mechanism addresses the case only after the resources become scarce. Therefore, there is a problem that it is not possible to perform stable operations upon trying to provide services intended for carriers and/or companies, which are required to be provided in real-time like an IP network system such as an IP telephone network.

Further, in a case of performing a live migration where the virtual machine is migrated to a different physical hardware without being stopped, a live-migration destination of the virtual machine is selected only based on the current state of resources. Thus, there is also a problem that even after the live migration, traffic immediately increases at the live-migration destination, which causes a situation where the live migration is repeated, thereby leading to deterioration in performance of the virtual machine or a rapid increase in traffic.

CITATION LIST

Patent Literature

PTL 1: Japanese Unexamined Patent Application Publication No. 2011-90537 (pages 12 to 15)

SUMMARY OF INVENTION

Technical Problem

As mentioned above, the conventional method of optimizing resources of a virtual machine is performed in consideration of only the current state of resources. Therefore, it is not possible to predict what a shortage of resources will occur till the resources actually get scarce, and it is not expected that stable operations can be performed in the IP network system like the IP telephone network where real-time operations are required.

Moreover, as mentioned above, the conventional virtual machine merely considers the current state of resources upon selecting the live-migration destination, but it does not consider traffic at the live-migration destination in the near future. Therefore, there is a problem that the live migration might occur frequently so that resources become scarce immediately after the migration in a host serving as the live-migration destination, and thus the live migration is repeated. If the live migration is repeatedly performed in such a manner, there is a possibility that the whole traffic will be increased in the IP network system like the IP telephone network where real-time operations are required, and that throughput of the virtual machine will be effected.

(Exemplary Object of the Present Invention)

The present invention has been accomplished in view of the above-mentioned problems, and an exemplary object of the present invention is to provide a resource optimization method enabling a stable live migration, an IP network system adopting the resource optimization method, and a resource optimization program enabling a computer to execute the resource optimization method.

Solution to Problem

In order to solve the above-mentioned problems, a resource optimization method, an IP network system and a resource optimization program according to the present invention mainly adopt the following characteristic configurations.

(1) The resource optimization method according to the present invention is a method of optimizing resources by performing a live migration of a virtual machine that processes communication calls in an IP network system. This method includes: estimating an amount of generated traffic that is anticipated to be generated, based on a number of subscribers to be processed by the virtual machine; and selecting, when the estimated amount of generated traffic exceeds an optimum value predetermined as throughput of physical hardware on which the virtual machine operates, an optimum physical hardware that has a margin for processing the amount of generated traffic, and live-migrating the virtual machine to the selected physical hardware.

(2) The IP network system according to the present invention is a system that optimizes resources by performing a live migration of a virtual machine processing communication calls. This system includes traffic estimating function means for estimating an amount of generated traffic that is anticipated to be generated, based on a number of subscribers to be processed by the virtual machine. The traffic estimating function means is configured to select, when the estimated amount of generated traffic exceeds an optimum value predetermined as throughput of physical hardware on which the virtual machine operates, an optimum physical hardware that has a margin for processing the amount of generated traffic, and to instruct the virtual machine to live-migrate to the selected physical hardware. The virtual machine receives the instruction, and then performs a live migration to the optimum physical hardware in accordance with the instruction.

(3) The resource optimization program according to the present invention implements at least the resource optimization method described in (1) as a program that can be executed by a computer.

Advantageous Effects of Invention

The resource optimization method, the IP network system and the resource optimization program according to the present invention can achieve the following advantageous effects.

The first advantageous effect is that it is possible to preliminarily predict an increase in traffic and to optimize resources of a virtual machine, because an amount of generated traffic in the future is predicted based on the number of subscribers or a result obtained by actually monitoring an amount of traffic.

The second advantageous effect is that it is possible to select, as physical hardware serving as a live-migration destination, physical hardware for which there is a low probability of an increase in an amount of processed traffic requiring another live migration in the future. This is because it is possible to select an optimum physical hardware that has a margin for a predicted value of traffic which is derived from the number of subscribers or the result obtained by actually monitoring the amount of traffic, and to notify the virtual machine of the selected physical hardware as the live-migration destination.

DESCRIPTION OF EMBODIMENTS

Figure 1:
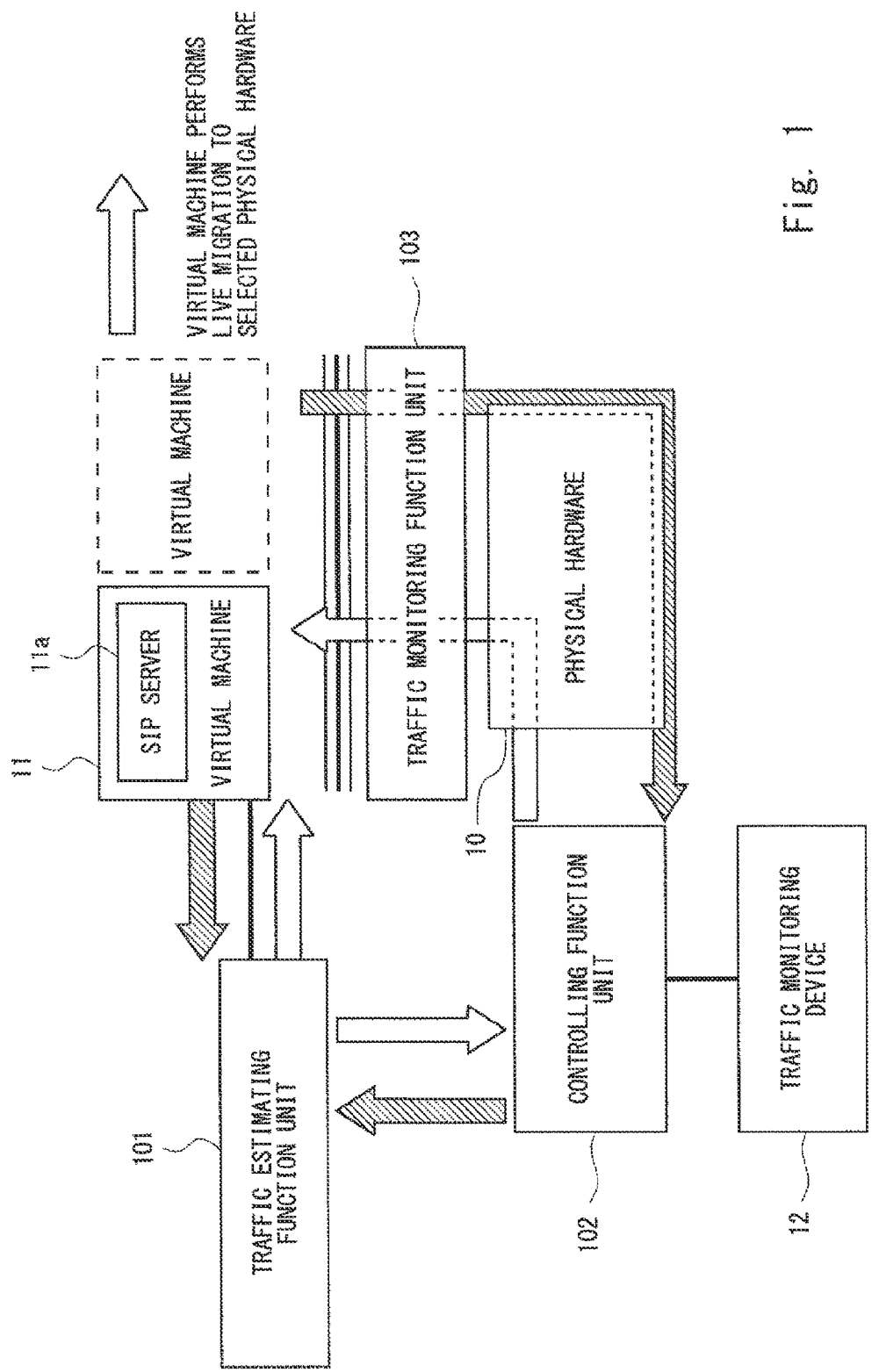
FIG. 1 is a system configuration diagram showing an example of system configurations of an IP network system according to the present invention.

Hereinafter, a preferred exemplary embodiment of a resource optimization method, an IP (Internet Protocol) network system and a resource optimization program according to the present invention will be described with reference to the accompanying drawings. Note that in the following description, the resource optimization method and the IP network system according to the present invention are described. However, it will be understood that the resource optimization method may be implemented as a resource optimization program which can be executed by a computer, or the resource optimization program may be stored in a computer readable storage medium.
(Features of the Present Invention)

Prior to describing the exemplary embodiment of the present invention, a summary of features of the present invention will firstly be described. The present invention includes principal features such as using a function of predicting traffic of a virtual machine in a system where real-time operations are required like an IP network system such as an IP telephone network, and optimizing resources of the virtual machine based on a result obtained by predicting an amount of traffic generated in the future.

In the prediction of traffic in the virtual machine, when the IP network system is applied to an IP telephone network system, for example, an amount of traffic generated in the future is estimated based on subscriber information accommodated in a SIP (Session Initiation Protocol) server on the virtual machine. Since the amount of traffic generated in the future increases when the number of subscribers increases, it is determined whether or not the virtual machine can be accommodated in the current physical hardware. When it is determined that the virtual machine cannot be accommodated therein, the virtual machine is live-migrated to a different physical hardware. Moreover, upon selecting a live migration destination, a capability of processing traffic in physical hardware serving as the live migration destination is referred to. Physical hardware, in which the future amount of traffic generated after an increase in the number of subscribers does not exceed an optimum value predetermined as an amount of traffic that can be processed, is selected. A live migration to the selected physical hardware is then performed.

Moreover, as a traffic estimating function unit, a function of estimating a network bandwidth generated in the future, i.e., the amount of generated traffic based on the number of subscribers to be processed by the SIP server on the virtual machine, or based on an amount of actually treated traffic, is provided. Thus, it is possible to preliminarily predict an amount of traffic generated in the future based on the number of subscribers or a result obtained by monitoring an actual change in the amount of traffic. Therefore, it is possible to solve the conventional problem that it is not possible to predict the probability of a shortage of resources occurring, and thus it is not expected that stable operations as the IP telephone network can be performed.

Further, the optimum physical hardware is preliminarily selected as the live migration destination by using the predicted value of traffic based on the number of subscribers or the result obtained by actually monitoring the amount of traffic, without treating only the current state of resources as a criterion for determining the live migration destination. Thus, it is possible to solve the situation where the live migration is repeated, thereby leading to deterioration in performance of a virtual machine or a rapid increase in traffic. Therefore, it is also possible to solve the conventional problem that resources immediately get scarce in a host serving as the live-migration destination and thus the live migration is repeated.

In other words, in the IP telephone network which is an example of the IP network system according to the present invention, the traffic estimating function unit constantly monitors the number of subscribers in the SIP server on the virtual machine, and performs the live migration of the virtual machine when the amount of traffic, which is anticipated to be generated in the future based on the number of subscribers, exceeds a predetermined reference value.

Furthermore, upon the live migration, the virtual machine takes the predicted value of traffic in the migration destination into consideration to select the live migration destination. As a method for doing this selection, the traffic estimating function unit receives from the virtual machine an inquiry about the live migration destination. Then, the traffic estimating function unit selects a host, i.e., physical hardware having a margin for a capability of processing the amount of traffic which is anticipated to be generated in the future, and notifies the virtual machine of the selected host. The virtual machine receives the notification, and then performs the live migration in accordance with received information on the host.
(Exemplary Embodiment of the Present Invention)

Next, the exemplary embodiment of the resource optimization method and the IP network system according to the present invention will be described as an example. As mentioned above, the resource optimization method according to the present invention can also be applied to the IP telephone network which is an example of the IP network system according to the present invention. That is, in preparation for a case where a SIP server is arranged on a virtual machine and the number of subscribers to be processed by the SIP server on the virtual machine increases, an increase and a decrease in the number of subscribers are monitored to constantly monitor whether or not traffic in physical hardware, on which the virtual machine is mounted, is in an optimum condition.

When it is determined that the traffic processed by the physical hardware is not in the optimum condition, a live migration is performed so that the virtual machine is migrated to different physical hardware. Moreover, upon performing the live migration in the present invention, the virtual machine is migrated to a live migration destination whose capability is optimum as physical hardware for processing the predicted traffic value.

Such a resource optimization method and IP network system can be applied to both an IP telephone network system in a company and an IP telephone network system provided by a communication carrier, and can also be applied to a typical IP network system which includes, as applications, not only phone calls but also communication calls handling data, images and the like.

(Configuration Example of Exemplary Embodiment)

Next, an example of system configurations of the IP network system according to the present invention will be described in detail with reference to FIG. 1. FIG. 1 is a system configuration diagram showing the example of system configurations of the IP network system according to the present invention, and is shown by taking as an example a case of applying the IP network system to an IP telephone network system.

An IP telephone network system shown in FIG. 1 is configured to include at least physical hardware 10, a virtual machine 11 operating on the physical hardware 10, a SIP server 11a operating on the virtual machine 11 to materialize an IP telephone system, a traffic estimating function unit 101 which estimates the future predicted value of traffic depending on the number of subscribers, a traffic monitoring device 12 monitoring actual traffic, a controlling function unit 103 controlling the traffic monitoring device 12, and a traffic monitoring function unit 103 which constantly monitors traffic in the virtual machine and outputs to the traffic estimating function unit 101a result obtained by monitoring as a criterion for estimating the traffic.

The traffic estimating function unit 101 estimates an amount of traffic which is anticipated to be generated in the future based on a result obtained by monitoring the number of subscribers to be processed by the SIP server 11a on the virtual machine 11, and thus constantly monitors whether or not the estimated amount of traffic exceeds an optimum capability that can be processed by the current physical hardware 10 on which the virtual machine 11 operates. When it is determined that the predicted amount of generated traffic exceeds the optimum capability of the current physical hardware, i.e., an optimum value, the traffic estimating function unit 101 instructs the virtual machine 11 to perform a live migration in which the virtual machine 11 is migrated from the current physical hardware 10 to different physical hardware 10 without stopping operations of an application processing IP phone calls and an OS.

The virtual machine 11 inquires of the traffic estimating function unit 101 about physical hardware 10 serving as a migration destination upon performing the live migration. When the traffic estimating function unit 101 receives the inquiry, the traffic estimating function unit 101 selects physical hardware 10, in which an amount of processed traffic becomes an optimum state, based on the future amount of generated traffic estimated from the number of subscribers in the SIP server 11a, and returns the selected physical hardware 10 to the virtual machine 11 serving as an inquiry source.

The virtual machine 11 performs operations for live-migrating to the physical hardware 10 selected as the live migration destination, based on information returned from the traffic estimating function unit 101. As a result, the physical hardware 10 after the live migration is performed can stably process traffic regarding IP phone calls handled by the SIP server 11a on the virtual machine 11 in an optimum state with leeway but without repeating any live migration, because of taking into consideration the result obtained by estimating the amount of traffic which is anticipated to be generated in the future depending on the number of subscribers.

(Description Regarding Operations of Exemplary Embodiment)

Figure 2:
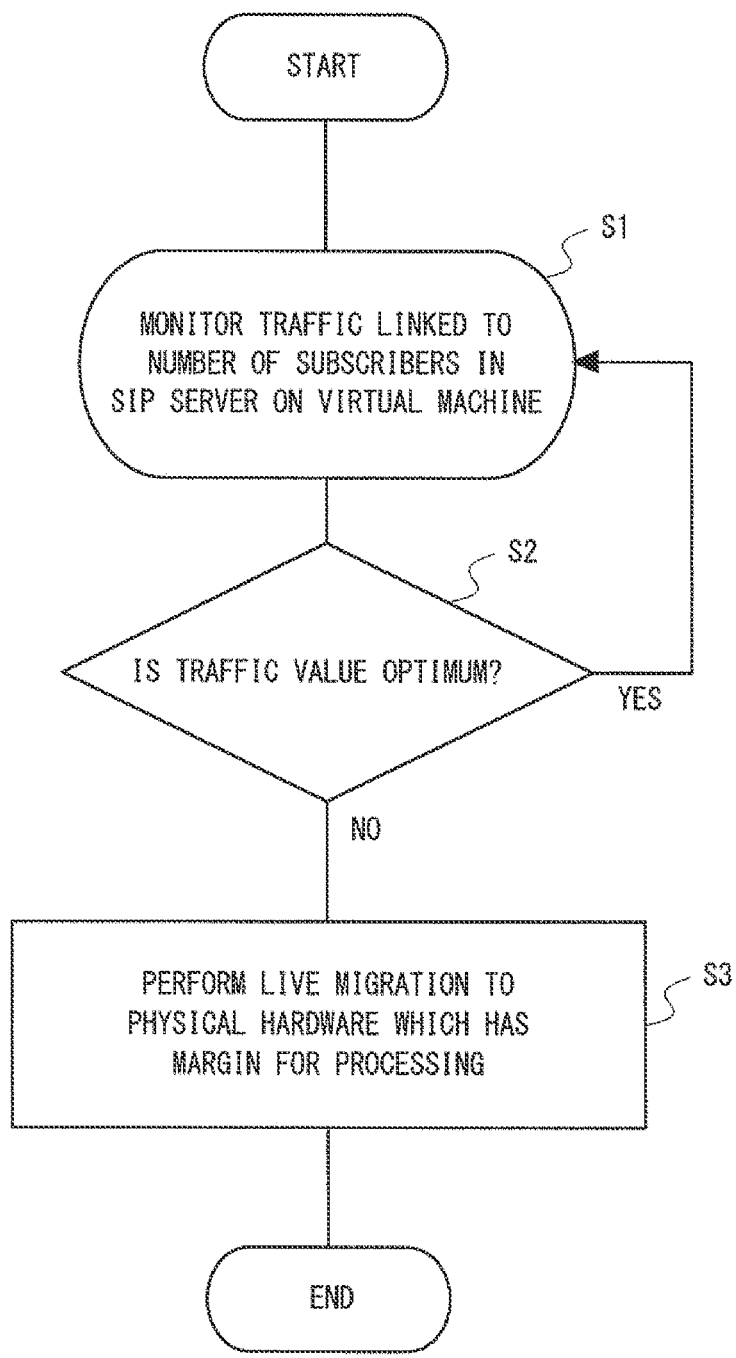
FIG. 2 is a flowchart for illustrating an example of operations of the IP network system shown in FIG. 1.

Next, an example of operations of the IP network system shown in FIG. 1 will be described in detail by using a flowchart shown in FIG. 2. FIG. 2 is the flowchart for illustrating the example of operations of the IP network system shown in FIG. 1, in which an IP telephone system is applied as an example of the IP network system, and shows an operation example of resource optimization that is performed based on the predicted value of traffic linked to the number of subscribers in the IP telephone system.

In the virtual machine 11 operating on the physical hardware 10, the SIP server 11a which has functions for materializing IP telephone services operates. The traffic estimating function unit 101 constantly monitors the number of subscribers in the SIP server 11a on the virtual machine 11, and thus monitors a traffic value which is anticipated to be generated in the future linked to the number of subscribers (step S1). As a result obtained by monitoring the number of subscribers, the traffic estimating function unit 101 checks whether or not a traffic value, which is anticipated to be generated in the future depending on the current number of subscribers, exceeds an optimum value predetermined as throughput of the physical hardware 10 on which the virtual machine 11 currently operates (step S2). If it is determined that the traffic value does not exceed the optimum value ("Yes" in step S2), it is not necessary to perform a live migration of the virtual machine 11. Therefore, the traffic estimating function unit 101 returns to step S1 to continue monitoring the number of subscribers in the SIP server 11a.

On the other hand, when it is determined that the traffic value exceeds the optimum value ("No" in step S2), the traffic estimating function unit 101 instructs the virtual machine 11 to perform a live migration.

Upon performing the live migration, the virtual machine 11 inquires of the traffic estimating function unit 101 as to which physical hardware 10 is the one having a margin for traffic processing. When the traffic estimating function unit 101 receives the inquiry, the traffic estimating function unit 101 selects an optimum physical hardware 10 which has a margin for processing the predicted value of traffic estimated based on the number of subscribers in the SIP server 11a on the virtual machine 11, and returns information indicating the selected physical hardware 10 to the virtual machine 11 serving as a inquiry source. The virtual machine 11 perform a live-migration to the physical hardware 10 selected at the traffic estimating function unit 101, based on the information returned from the traffic estimating function unit 101 (step S3).

In this way, the live migration is performed for the physical hardware 10 for which it has been preliminarily checked as to whether it has, as the optimum physical hardware 10, the margin for processing the predicted value of traffic estimated based on the number of subscribers in the SIP server 11a. Therefore, after the live migration, the SIP server 11a on the virtual machine 11 can stably and reliably process traffic, and thus can stably operate.

Note that while there has been described the case where the traffic estimating function unit 101 estimates the traffic value based on the number of subscribers in the above-mentioned exemplary embodiment, the present invention is not limited to this case. For example, as a substitute for predicting the future amount of generated traffic based on the number of subscribers, the amount of traffic which is anticipated to be generated in the future may be estimated based on a result obtained by monitoring the actual traffic, by use of the traffic monitoring function unit 103 which constantly monitors the actual traffic in the SIP server 11a on the virtual machine 11.

Moreover, both the estimated value of traffic which is anticipated to be generated in the future based on the number of subscribers and the result which is obtained by the traffic monitoring function unit 103 monitoring the actual traffic may be used together. That is, by using the result which is obtained by the traffic monitoring function unit 103 monitoring the actual traffic and based thereon, the traffic estimating function unit 101 may determine whether or not the estimated value of traffic which is anticipated to be generated in the future based on the number of subscribers has been proper.

In this way, by using together both of the estimated value of traffic which is anticipated to be generated in the future based on the number of subscribers and the result which is obtained by the traffic monitoring function unit 103 monitoring the actual traffic, when there is caused a wide gap that is greater than or equal to a predetermined threshold between the estimated value of traffic based on the number of subscribers and the value of actual traffic obtained by the traffic monitoring function unit 103, it means that there is caused a substantial margin of error in the estimated value of traffic based on the number of subscribers. By prompting a maintainer to review settings on the estimated value of traffic in accordance with the number of subscribers, it is possible to realize further stable system administration.

(Description Regarding Advantageous Effects of Exemplary Embodiment)

As described above, this exemplary embodiment can achieve the following advantageous effects.

The first advantageous effect is that it is possible to preliminarily predict an increase in traffic and to optimize resources of the virtual machine 11, because the amount of generated traffic in the future is predicted based on the number of subscribers or the result obtained by actually monitoring the amount of traffic.

The second advantageous effect is that it is possible to select, as physical hardware serving as the live-migration destination, the physical hardware 10 which has a low probability of an increase in the amount of processed traffic requiring another live migration in the future. This is because it is possible to select, at the traffic estimating function unit 101, the optimum physical hardware 10 that has a margin for the predicted value of traffic which is derived from the number of subscribers or the result obtained by actually monitoring the amount of traffic, and to notify the virtual machine 11 of the selected physical hardware 10 as the live-migration destination.

While the present invention has been described as the configurations of hardware in the above-mentioned exemplary embodiment, the invention is not limited to these configurations. In the present invention, arbitrary processing can also be realized by causing a CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described with reference to the exemplary embodiment, the invention is not limited to this embodiment. It will be understood by those of ordinary skill in the art that various changes in form and details may be made therein without departing from the spirit and scope of the present invention.

This application is based upon and claims the benefit of priority from Japanese patent application No. 2011-200433, filed on Sep. 14, 2011, the disclosure of which is incorporated herein in its entirety by reference.

REFERENCE SIGNS LIST

10 PHYSICAL HARDWARE
11 VIRTUAL MACHINE
11a SIP SERVER
12 TRAFFIC MONITORING DEVICE
101 TRAFFIC ESTIMATING FUNCTION UNIT
102 CONTROLLING FUNCTION UNIT
103 TRAFFIC MONITORING FUNCTION UNIT

The invention claimed is:

1. A resource optimization method, comprising:
   estimating an amount of generated traffic that is anticipated to be generated, based on a number of subscribers to be processed by a virtual machine;
   selecting, when the estimated amount of generated traffic exceeds an optimum value predetermined as throughput of physical hardware on which the virtual machine operates, an optimum physical hardware that has a margin for processing the amount of generated traffic, and live-migrating the virtual machine to the selected physical hardware,
   comparing a result obtained by monitoring actual traffic with the amount of generated traffic estimated based on the number of subscribers; and
   performing, when there is caused a wide gap that is greater than or equal to a predetermined threshold between the result and the amount of generated traffic, a notification to a maintainer to prompt a review of settings on the amount of generated traffic estimated based on the number of subscribers.

2. The resource optimization method according to claim 1, including:

estimating the amount of generated traffic that is anticipated to be generated, based on a result obtained by monitoring actual traffic as a substitute for the number of subscribers.

3. The resource optimization method according to claim 1,
wherein the IP network system comprises an IP telephone network system intended for IP phone calls, and a SIP (Session Initiation Protocol) server processing the IP phone calls is arranged on the virtual machine,
wherein the number of subscribers comprises a number of subscribers to be processed by the SIP server.

4. An IP network system comprising:
a memory containing program instructions; and
a processor configured to execute the program instructions to:
estimate an amount of generated traffic that is anticipated to be generated, based on a number of subscribers to be processed by a virtual machine,
select, when the estimated amount of generated traffic exceeds an optimum value predetermined as throughput of physical hardware on which the virtual machine operates, an optimum physical hardware that has a margin for processing the amount of generated traffic,
instruct the virtual machine to live-migrate to the selected physical hardware,
compare a result obtained by monitoring actual traffic with the amount of generated traffic estimated based on the number of subscribers, and
perform, when there is caused a wide gap that is greater than or equal to a predetermined threshold between the result and the amount of generated traffic, a notification to a maintainer to prompt a review of settings on the amount of generated traffic estimated based on the number of subscribers, and
wherein the instructions are configured to instruct the virtual machine to perform a live migration to the optimum physical hardware.

5. The IP network system according to claim 4,
wherein the traffic estimating function processor executes the instructions to estimate the amount of generated traffic that is anticipated to be generated, based on a result obtained by monitoring actual traffic as a substitute for the number of subscribers.

6. The IP network system according to claim 4, wherein a SIP (Session Initiation Protocol) server processing IP phone calls is arranged on the virtual machine, and the number of subscribers comprises a number of subscribers to be processed by the SIP server.

7. A non-transitory computer readable medium storing a resource optimization program, the program implementing the resource optimization method according to claim 1 as a program that can be executed by a computer.

* * * * *